Sept. 11, 1962        R. C. JOSCHKO        3,053,167
COFFEE MAKING DEVICE
Filed Nov. 4, 1958                                       2 Sheets-Sheet 1
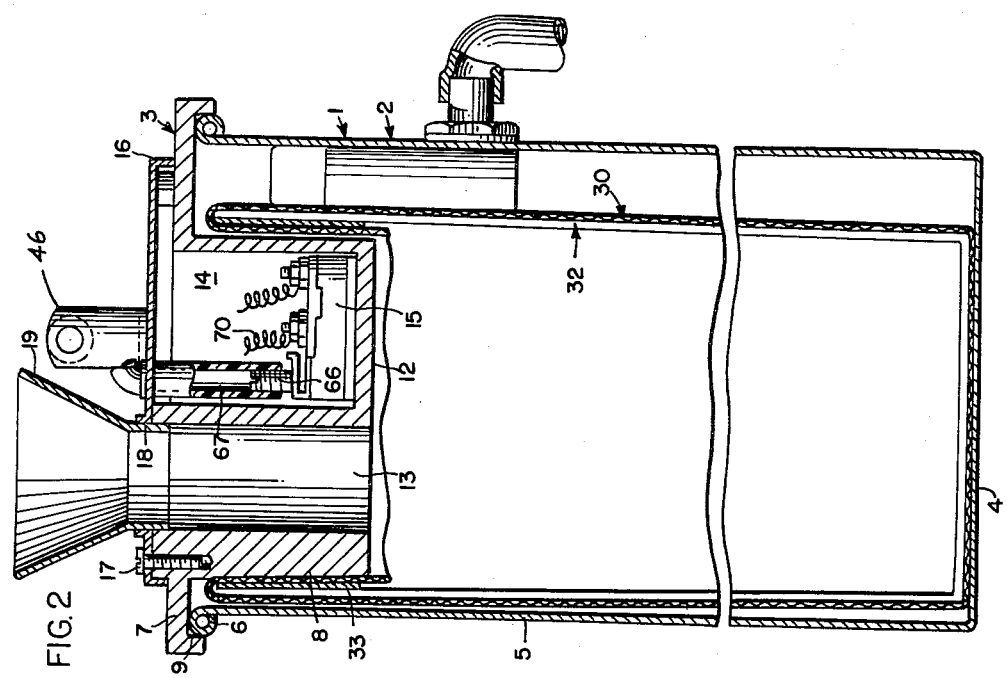
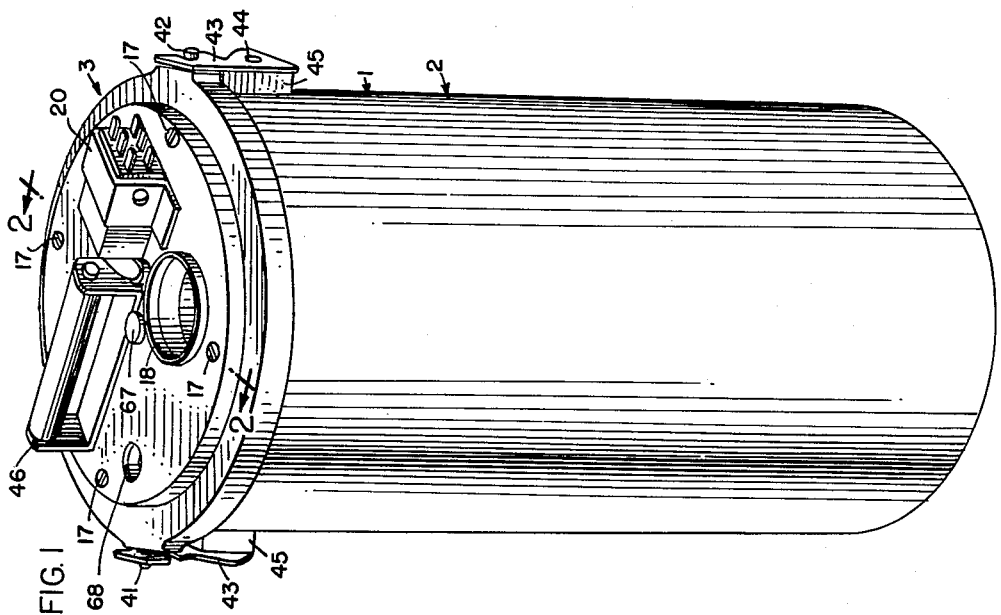
INVENTOR:
RAYMOND C. JOSCHKO
BY *Merzall, Johnston,*
*Cook & Root*
ATT'YS Sept. 11, 1962 R. C. JOSCHKO 3,053,167
COFFEE MAKING DEVICE
Filed Nov. 4, 1958 2 Sheets-Sheet 2

INVENTOR:
RAYMOND C. JOSCHKO
BY Marshall, Johnston,
Cook & Root
ATT'YS 3,053,167
COFFEE MAKING DEVICE
Raymond C. Joschko, Minneapolis, Minn., assignor to Automatic Canteen Company of America, Chicago, Ill., a corporation of Delaware
Filed Nov. 4, 1958, Ser. No. 771,912
9 Claims. (Cl. 99—281)

This invention relates to coffee making apparatus and, more particularly, to apparatus for automatically brewing and vending coffee.

It is a primary object of my invention to enable coffee to be brewed in, stored in, and dispensed from, a single container in a novel and expeditious manner.

Other coffee making and vending machines or apparatus have been heretofore known in the art but have had several inherent disadvantages such as, for example, requiring the use of powdered or so-called "instant" coffee; not efficiently straining the coffee grounds, or the like, from the liquid to be dispensed; not effectively maintaining the proper strength of the stored beverage; not effectively preventing the coffee to be dispensed from being diluted by new charges of hot water fed into the apparatus; or not being efficient and reliable in operation, and the like. It is an important object of my invention to overcome such disadvantages.

Another object of my invention is to afford a novel coffee making and vending apparatus of the type wherein brewed coffee may be dispensed from a relatively large container in increments of a cup, or the like, and as such dispensing takes place, the supply of coffee in the container is automatically replaced by charges of water and ground coffee being fed thereinto.

Yet another object of my invention is to afford novel coffee making and vending apparatus of the aforementioned type wherein the parts are so constituted and arranged that, in a single container, the beverage to be dispensed is separated from the coffee grounds in a novel and expeditious manner.

A further object is to afford such novel coffee making and vending apparatus, wherein the parts are so constituted and arranged as to prevent undesirable dilution of the coffee being dispensed by the new supply of water being added from time to time to the container.

Another object is to afford a novel coffee brewing and dispensing tank or container embodying parts constituted and arranged so as to afford an inlet and brewing area, and a discharge area, with the two areas separated from each other in a novel and expeditious manner.

Yet another object of the present invention is to afford a novel coffee making and vending apparatus of the aforementioned type wherein the brewed coffee may be stored therein in a manner to assure the proper taste and quality thereof for prolonged periods of time.

A further object is to afford a novel coffee making and vending apparatus of the aforementioned type which is relatively small and compact in size.

Yet another object of the present invention is to afford a novel coffee making and vending apparatus of the aforementioned type which may be quickly and easily embodied in coin operated vending machines for the commercial vending of coffee by the cup.

Another object is to afford a novel coffee making and vending apparatus of the aforementioned type which is efficient in operation and may be readily and economically produced commercially.

Other and further objects of the present invention will be apparent from the following description and claims and are illustrated in the accompanying drawings which, by way of illustration, show the preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a perspective view of a combination coffee brewing and vending tank or container of the type particularly well adapted for embodiment in coin controlled coffee vending machines, or the like, and embodying the principles of my invention;

FIG. 2 is a longitudinal sectional view taken substantially along the line 2—2 in FIG. 1;

FIG. 7 is a diagrammatic illustration of my novel apparatus embodied in a typical vending machine, or the like.

Figure 3:
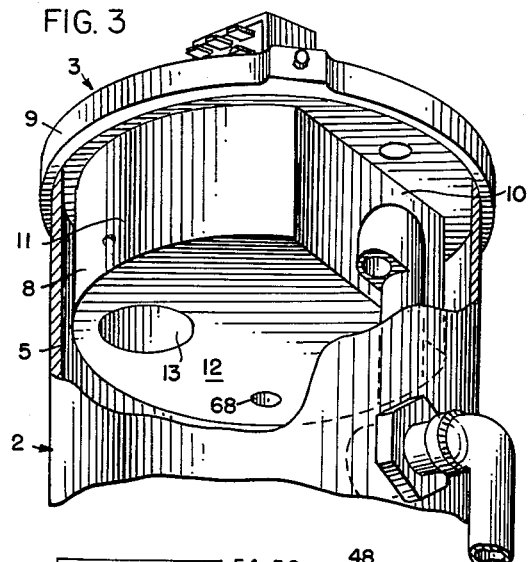
FIG. 3 is a detail perspective view of a portion of the tank shown in FIG. 1, with certain parts of the tank broken away to show interior parts therein.

In the drawings, novel coffee making and vending apparatus, embodying the principles of my invention, is shown to illustrate the preferred embodiment of my invention.

The coffee making and vending apparatus shown in the drawings includes a combination coffee brewing and vending tank or container 1, including a cylindrical body portion 2 and a removable top or cover member 3.

The body portion 2 of the container 1 embodies a bottom wall 4 and a tubular-shaped sidewall portion 5, the bottom wall 4 extending across and closing the lower end portion of the sidewall portion 5. The body portion 2 is open at the top, and the upper edge portion of the sidewall 5 is preferably reversely bent outwardly to form a flange 6 thereon.

The cover member 3 embodies a substantially annular-shaped flange 7, from the inner edge portion of which a body portion 8 projects downwardly. The flange 7 has a downwardly projecting outer peripheral lip 9, and is of such size that it may rest on the upper edge portion of the body portion 2 of the tank 1 with the lip 9 disposed in closely engaging, outwardly adjacent relation to the flange 6 on the upper edge portion of the sidewall 5.

The body portion 8 of the cover member 3 is in the form of a boss which projects downwardly from the flange 7 into the body portion 2 of the tank 1 when the flange 7 of the cover 3 is disposed in normal overlying relation to the upper end of the sidewall 5. The body portion 8 is in the shape of approximately four-fifths of a cylinder, having a flat straight sidewall portion 10 on one side thereof, FIG. 3. The sidewall portions 10 and 11 are perpendicular to a bottom wall portion 12 which is in the form of approximately four-fifths of a circle, being of the same outer shape as that defined by the sidewall portions 10 and 11, and being disposed in a plane parallel to the plane of the flange 7. The body portion 8 is so disposed on the flange 7, and the radius of the portion 11 is such, that the latter is disposed in inwardly spaced, but relatively closely adjacent relation to the adjacent portion of the sidewall 5 when the cover 3 is disposed in normal container-closing relation to the body portion 2. The sidewall portion 10, of course, is on a chord of the circle of which the sidewall portion 11 forms a part and, therefore, is spaced a greater distance from the adjacent portion of the sidewall 5. The spacing of the sidewall portions 10 and 11 from the inner face of the sidewall 5 is of significance, as will be discussed in greater detail presently.

A straight tubular-shaped opening 13 extends vertically through the body portion 8 of the cover member 3 on the opposite side of the vertical center line of the body portion 8 from the sidewall portion 10. An upwardly opening recess 14 is formed in the body portion 8 between the opening 13 and the flat sidewall portion 10, and a bimetallic thermostat 15 is mounted in the bottom of the recess 14 for controlling the temperature of the contents of the tank 1 as will be discussed in greater detail presently.

The cover member 3 also includes a substantially circular-shaped cover plate 16, which is of such size as to overlie the inner edge portion of the flange 7. The cover plate 16 is disposed in centered position on the flange 7 and is removably secured in such position by suitable means such as bolts 17. The cover member 16 is disposed in overlying relation to the recess 14, and has an opening 18 therein which is of the same diameter, and is disposed in axial alignment with, the opening 13 in the body portion 8, FIG. 2. A funnel 19 is disposed in vertical position in the opening 18 in the cover member 16 for a purpose which will be discussed in greater detail presently.

A connector plug 20 is mounted on the upper face of the cover plate 16 and is connected to the bimetallic thermostat 15 by suitable leads 70, FIGS. 1 and 2, the connector plug 20 affording means by which the thermostat 15 may be readily connected to suitable controls, as will be discussed in greater detail presently.

Figure 6:
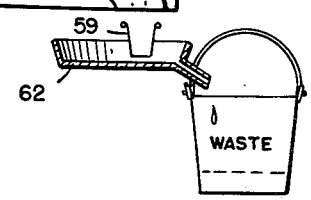
FIG. 6 is an enlarged detail perspective view of a portion of the apparatus shown in FIGS. 2 and 3.

A substantially inverted J-shaped syphon 25, having a long leg 26 and a short leg 27, is disposed in substantially upright position in the body portion 2 of the tank 1, FIGS. 2, 3 and 6. The lower end of the long leg 26 of the syphon 25 is connected into a nipple 28, which extends outwardly through and is sealed in the sidewall 5 of the body portion 2 of the tank 1. The nipple 28 affords a discharge conduit for the syphon 25. The downwardly opening end 29 of the leg 27, which is disposed above the lower end of the leg 26, affords an inlet opening for the syphon 25. The syphon 25 is so disposed on the upper end portion of the body portion 2 of the tank 1, that when the cover member 3 is disposed in normal closing relation to the body portion 2, the discharge nipple is disposed below the body portion 8 of the cover member 3, and the syphon 25 projects upwardly between the flat wall portion 10 of the cover member 3, and the adjacent portion of the sidewall 5 of the tank body member 2. The inlet opening 29 in the syphon 25 is disposed above the bottom 12 of the body portion 8 a sufficient distance that, when the space between the flat wall portion 10 and the adjacent sidewall portion 5 is filled with liquid to the level of the inlet 29, approximately two or three cups of such liquid are then disposed in that space.

In my novel coffee making and vending apparatus, an elongated bag 30, made of suitable material such as, for example, muslin, or the like, and having an open top 31, is mounted in the body portion 2 of the tank 1 with the open top 31 disposed in surrounding, relatively closely fitting relation to the body portion 8 of the cover member 3. The bag 30 is removably mounted on an elongated frame 32 which includes a ring member 33 at its upper end, and three equally spaced supporting legs 34, 35 and 36 projecting downwardly from the ring 33, FIGS. 2, 4 and 5. The ring 33 may be made of any suitable material such as, for example, a band of stainless steel, and the legs 34—36 may also be made of any suitable material such as, for example, stainless steel wire. Each of the legs 34—36 is substantiall L-shaped, each having a lower end portion 37, 38 and 39, respectively, the leg portions 37—39 projecting inwardly toward each other and being secured together at a common center point 40, FIG. 5. The ring 33 is of a shape generally complementary to that of the body portion 8 of the cover member 3, but is sufficiently larger than the body member 8 that it may fit therearound with a relatively loose fit. The legs 34—36 are of such length that when the frame 32 is disposed in the body portion 2 of the tank 1, and the cover member 3 is disposed in normal container closing position on the body portion 2, the ring 33 is supported by the legs 34—36 from the bottom 4 of the body portion 2 in surrounding relation to the body portion 8 of the cover member 3.

Figure 4:
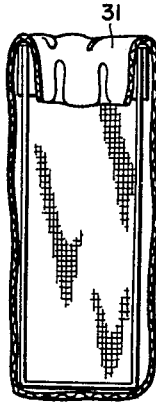
FIG. 4 is a detail sectional view of a portion of the apparatus shown in FIG. 2.
Figure 5:
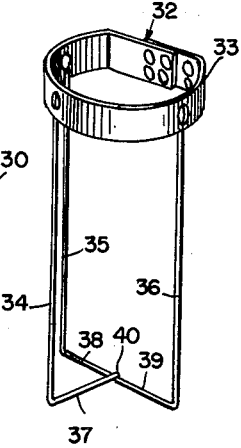
FIG. 5 is a perspective view of a portion of the apparatus shown in FIG. 4.

In mounting the bag 30 on the frame 32, the bag 30 may be slipped upwardly over the frame 32, and the open upper edge portion 31 of the bag 30 may then be folded downwardly inside of the ring 33, FIGS. 2 to 4. With the bag 30 thus disposed on the frame 32, the bag and frame may be mounted in the body portion 2 of the tank 1, with the bottom of the bag 30 resting on the bottom 4 of the body portion 2. The cover member 3 may then be mounted on the body portion 2, with the body portion 8 of the cover member 3 disposed inside of the ring 33. While the ring 33 is disposed around the body portion 8 with a relatively loose fit, the fit thereof is sufficiently tight that, with the upper edge portion 31 of the bag 30 disposed inside of the ring 33, the upper edge portion 31 is clamped between the ring 33 and the body portion 8 so as to prevent the bag 30 from dropping downwardly into the body portion 2 of the tank 1.

The body portion 8 of the cover member 3 is so disposed on the cover member 3 that the bag 30, when it is thus mounted in the body portion 2 of the tank 1, is disposed closely adjacent to, but not pressed against those portions of the sidewall 5 which are disposed directly opposite the sidewall portion 11 of the body member 8, and it is disposed in inwardly spaced relation to the syphon 25, FIG. 2.

Two diametrically opposed pins 41 and 42 project outwardly from the cover member 3, FIG. 1. Two latching levers or hooks 43 are pivotally mounted by pins 44 on bosses 45 projecting outwardly from the body portion 2 of the tank 1 directly below the respective pins 41 and 42. The latching levers 43 are disposed on the body portion 2 in such position that they may be swung upwardly around the pins 44 into latching engagement with the pins 41 and 42 to thereby hold the cover 3 on the tank 1. When it is desired to remove the cover member 3 from the body portion 2 of the tank 1, the latching members 43 may be pivoted downwardly around the screws 44 to thereby release the pins 41 and 42. A handle 46 is mounted on the upper face of the cover member 3 to afford a readily accessible means for carrying the tank 1, and also, for lifting the cover member 3 from the body portion 2 of the tank 1 when this is desired.

From the foregoing, it will be seen that I have afforded a novel coffee making and vending apparatus wherein water and ground coffee may be fed through the funnel 19 and the openings 18 and 13 into the bag 30 in the tank 1, the tank 1 being initially charged with a sufficient quantity of water and ground coffee that the top of the liquid level in the tank 1 is disposed at the outlet opening 29 of the syphon 25. It will be understood, of course, that the ground coffee fed inwardly through the funnel 19 into the tank 1 is fed thereinto in the proper proportion to the amount of water likewise fed into the tank 1 to result in coffee of the desired strength. The water is preferably fed into the tank 1 at a temperature of 180° F., and the contents of the tank 1 are preferably stored at a temperature of 160° F.

The short leg 27 of the syphon 25 is of such a length that with the liquid level disposed at the opening 29 of the syphon 25, if another cup of hot water is fed into the tank 1 through the funnel 19, the liquid level in the tank 1 is raised a sufficient amount that a cup of brewed coffee flows outwardly through the syphon 25 and is discharged from the tank 1 through the nipple 28. As each such additional charge of hot water is fed inwardly through the funnel 19, a corresponding proper charge of ground coffee is simultaneously fed inwardly through the funnel 19 so that the contents of the tank are continuously recharged with water and coffee each time a cup of coffee is withdrawn therefrom.

The tank 2 is preferably of twenty-four cup, or more, capacity, so that the addition of a recharging cup of water has no appreciable diluting effect on the beverage to be dispensed therefrom. It has been found that with a coffee brewing and dispensing apparatus constructed in accordance with the principles of my invention, continuous dispensing of coffee therefrom at a rate of three or four cups of coffee per minute does not result in the dispensing of an unpalatable cup of coffee.

My novel coffee making and vending apparatus is particularly well adapted for embodiment in coin controlled coffee vending machines such as, for example, vending machines of the type shown in the copending application for United States Letters Patent of Richard J. Mueller, Serial No. 738,355, filed May 28, 1958, but, as will be appreciated by those skilled in the art, is not limited thereto, and may be used for other purposes and in other installations such as, for example, in restaurants, and the like, for dispensing coffee.

Figure 7:
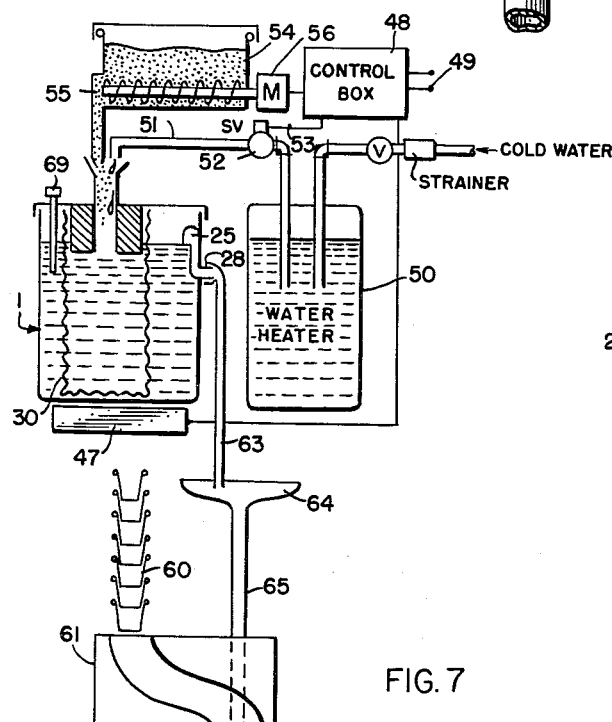

In the operation of my novel coffee making and vending apparatus, the tank 1 may be mounted on a suitable electrically operated heating element 47, connected through suitable controls 48 to a suitable source of power 49, as diagrammatically illustrated in FIG. 7. The water to be fed into the tank 1 may be preheated in a suitable heater such as the heater 50, and may be fed from the heater 50 into the tank 1 through a conduit 51, suitable controls such as a solenoid valve 52 being embodied in the conduit 51 for controlling the flow of water from the heater 50 to the tank 1. The solenoid valve 52 may be connected to the controls 48 by suitable conductors 53. The coffee to be fed into the tank 1 may be stored in a suitable hopper 54, and may be fed by suitable feed mechanism 55 driven by drive mechanism 56, the drive mechanism being connected to and controlled by the controls 48.

When my novel apparatus is disposed in a coin controlled vending machine such as is disclosed in the aforementioned Mueller application, Serial No. 738,355, and a proper coin is fed into the machine, a cup 59 is fed from a stack of cups 60 by a cup drop mechanism 61 into position such as, for example, on a drainboard or drain tray 62, and a cupful of water is fed from the heater 50 through the conduit 51 into the tank 1. At this same time, a charge of ground coffee is fed by the feed mechanism 55—56 from the hopper 54 into the tank 1. The feeding of the water from the heater 50 into the tank 1 is effective to raise the water level in the tank 1 a sufficient distance that the syphon 25 automatically begins to flow, thereby discharging liquid outwardly from the tank 1 through the nipple 28. The coffee discharged from the nipple 28 may be fed through suitable means such as, for example, a conduit 63, a bowl 64, and a conduit 65 into a cup 59. After the cup 59 has been filled by the beverage from the tank 1, and the beverage has discontinued flowing from the syphon 25, the customer may remove the cup 59 from the machine.

Upon insertion of another proper coin in the machine, the cycle of operation may again be repeated, a new charge of water and a new charge of ground coffee being fed into the tank 1 during each cycle of operation so that the liquid in the tank 1 is maintained at substantially the same strength at all times.

It will be remembered that the bimetallic thermostat 15 is connected by conductors 70 to the connector plug 20. The connector plug 20 may be connected by suitable conductors, not shown, to the controls 48, to thereby control the operation of the heater 47. An adjusting screw 66 is embodied in the thermostat 15, and an opening 67 is formed in the cover member 3 and opens upwardly therethrough. A screwdriver, or the like, may be inserted through the opening 67 to adjust the screw 66.

Another opening 68, FIGS. 1 and 3, extends vertically through the cover member 63, and affords an opening into which a thermometer 69, FIG. 7, may be inserted for keeping a close visual check on the temperature of the liquid in the tank 1.

It will be seen that with my novel apparatus, the coffee grounds are effectively contained in the bag 30 and are strained from the liquid which is discharged outwardly from the tank 1 through the syphon 25. Also, it will be seen that with the body portion 8 of the cover member 3 extending downwardly within the body portion 2 of the tank 1, it forms a partial barrier, and the space between the flat sidewall 10 and the adjacent portion of the sidewall 5 is reduced to such size that the feeding of a cup of water through the opening 13 into the tank 1 is effective to raise the liquid level in the tank 1 an appreciable distance, even though the total volume of the tank 1 is several times greater than such one cup capacity.

The tank 1 may be made of any suitable material such as, for example, stainless steel, and it will be seen that my novel apparatus is so constituted and arranged that it may be readily inserted in and removed from a vending machine, or the like, and may be readily serviced. The serviceman can readily raise the cover member 3 from the body portion 2 of the tank 1, lift out the bag 30 and the frame 32, and thereby remove the coffee grounds in the bag 30. The body member 2 may be readily cleaned and, if desired, a new bag 30 may be quickly and easily substituted for the previously used bag.

Thus, while I have illustrated and described the preferred embodiment of my invention, it is to be understood that this is capable of variation and modification, and I therefore do not wish to be limited to the precise details set forth, but desired to avail myself of such changes and variations as fall within the purview of the following claims.

I claim:

1. Coffee making and vending apparatus comprising a normally upright receptacle, a liquid barrier extending downwardly into said receptacle and terminating in spaced relation to the bottom of the latter, said barrier being disposed in the upper end portion of said receptacle only, said barrier being disposed in spaced relation to one upper side portion of said upper end portion, a porous bag mounted in said receptacle in depending relation to said barrier, means for feeding ground coffee and water downwardly through said barrier into said bag, and means for feeding liquid outwardly of said receptacle from the area between said barrier and said one upper side portion when said receptacle is disposed in said upright position.

2. Coffee making and vending apparatus comprising a receptacle, a liquid barrier extending downwardly into said receptacle and terminating in spaced relation to the bottom of the latter, said barrier being disposed in the upper end portion of said receptacle in spaced relation to one upper end portion of said receptacle and in more closely spaced relation to the remaining upper end portion of said receptacle, a porous bag mounted in said receptacle in depending relation to said barrier, means for feeding ground coffee and water downwardly through said barrier into said bag, and syphon means mounted in said receptacle between said barrier and said one upper end portion and opening outwardly of said receptacle for discharging liquid from said receptacle.

3. Coffee making and vending apparatus comprising a substantially cylindrical-shaped, normally upright receptacle, a liquid barrier extending downwardly into said receptacle and terminating in spaced relation to the bottom of the latter, said barrier having one substantially flat side wall portion with the remainder of said side wall being arcuate in shape, said barrier being disposed in the upper end portion of said receptacle with said one portion disposed in spaced relation to one upper side portion of the latter and with said remainder disposed in more closely adjacent relation to the remaining upper side portion of said receptacle, a porous bag mounted in said receptacle, means for supporting said bag in depending relation to said barrier with the upper end portion of said bag extending around said barrier, means for feeding ground coffee and water into said bag, and means for discharging liquid from said receptacle from between said substantially flat side wall portion and one upper side portion when said receptacle is disposed in said upright position.

4. Coffee making and vending apparatus comprising a normally upright receptacle of substantially uniform cross-sectional size, a liquid barrier extending downwardly into said receptacle and terminating in spaced relation to the bottom of the latter, said barrier being disposed in the upper end portion of said receptacle in more distantly spaced relation to one upper side portion of the latter than to the oppositely disposed upper side portion of said receptacle, a porous bag mounted in said receptacle, supporting means resting on the bottom of said receptacle in position to support said bag in upright position in said receptacle with the upper end of said bag disposed around said barrier, means for feeding ground coffee and water through said barrier into said bag, and means in said receptacle for discharging liquid therefrom from an area outside of said bag and disposed above the bottom of said barrier and below the top of said bag between said one upper side portion and said barrier when said receptacle is in upright position.

5. Coffee making and vending apparatus comprising a receptacle, a liquid barrier extending downwardly into said receptacle and terminating in spaced relation to the bottom of the latter, said barrier being disposed in the upper end portion of said receptacle in spaced relation to one upper side portion of the latter, a porous bag mounted in said receptacle, a rack mounted in said bag and resting on the bottom of said receptacle in position to support said bag in said receptacle with the upper end of said bag disposed in enclosing relation to said barrier and clamped thereagainst by said rack, means for feeding ground coffee and water into said bag, and means mounted in said receptacle outside of said bag for discharging liquid from said receptacle directly from between said barrier and said one upper side portion.

6. In coffee making apparatus, a tank including a normally upright body portion and a top cover member, said cover member having one portion projecting downwardly into said body portion and horizontally filling a major portion of an upper end portion of said body portion, means mounted in said tank in position to discharge coffee liquid therefrom directly from an area disposed outside of said major portion and disposed above the bottom of said one portion when said body portion is disposed in said upright position, an open-topped porous bag supported in said tank in depending relation to said one portion with the upper end of said bag disposed in closely fitting encircling relation to said one portion, and means for feeding hot water and ground coffee downwardly through said one portion into said bag to replenish the liquid coffee discharged from said tank.

7. In coffee making apparatus, a tank including a body portion and a top cover member, said cover member having one portion projecting downwardly into an upper end portion of said body portion only horizontally filling a major portion of said upper end portion of said body portion, a bag disposed in depending relation to said one portion for holding ground coffee in said tank, means mounted in said tank for discharging liquid directly from an area outside of said major portion and above the bottom of said one portion, and means including heat sensitive control means mounted in said one portion below said one area for controlling the temperature of the liquid in said tank.

8. In coffee making apparatus, a tank including a body portion and a top cover member, said cover member having one portion projecting downwardly into said body portion and horizontally filling a major portion of an upper end portion of said body portion, a bag disposed in depending relation to said one portion for holding ground coffee in said tank, means mounted in said tank for discharging liquid directly from an area outside of said major portion and above the bottom of said one portion, said one portion having an upwardly opening recess formed therein, means, including heat sensitive control means mounted in said recess below said one area, for controlling the temperature of the liquid in said tank, and means extending through said one portion outwardly of said recess for feeding ground coffee and hot water into said bag.

9. In coffee making apparatus, a tank including an upstanding body portion normally disposed in upright position, and a top cover, said body portion having an upper end portion of substantially uniform cross-sectional size, said cover having one portion projecting downwardly into said upper end portion, said one portion having one horizontally facing portion spaced from said upper end portion with the remaining horizontally facing portion of said one portion in more closely adjacent relation to said upper end portion, said one portion filling a major portion of said upper end portion, a bag mounted on said one portion in depending relation thereto, means for feeding ground coffee and water through said cover into said bag, and means for discharging liquid from said tank directly outwardly from an area disposed between said one horizontally facing portion and said upper end portion and disposed above the bottom of said one portion when said body portion is disposed in said upright position.

References Cited in the file of this patent
UNITED STATES PATENTS

| | | |
|---|---|---|
| 93,153 | Willoughby | July 27, 1869 |
| 343,812 | Gore | June 15, 1886 |
| 600,818 | West | Mar. 15, 1898 |
| 1,413,012 | Dubwisson | Apr. 18, 1922 |
| 1,513,685 | Andovino | Oct. 28, 1924 |
| 1,563,155 | Buckingham | Nov. 24, 1925 |
| 1,743,033 | Ford | Jan. 7, 1930 |
| 1,922,782 | Schallis | Aug. 15, 1933 |
| 2,808,775 | Schott | Oct. 8, 1957 |

FOREIGN PATENTS

| | | |
|---|---|---|
| 340,816 | France | May 21, 1904 |
| 12,489 | Great Britain | June 10, 1908 |
| 36,885 | Sweden | June 3, 1914 |
| 601,634 | Great Britain | May 10, 1948 |